Dec. 30, 1924.
H. J. GUTTMAN
1,521,289
CLAMP FOR BAKING PANS AND THE LIKE
Filed March 4, 1922    3 Sheets-Sheet 1
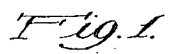
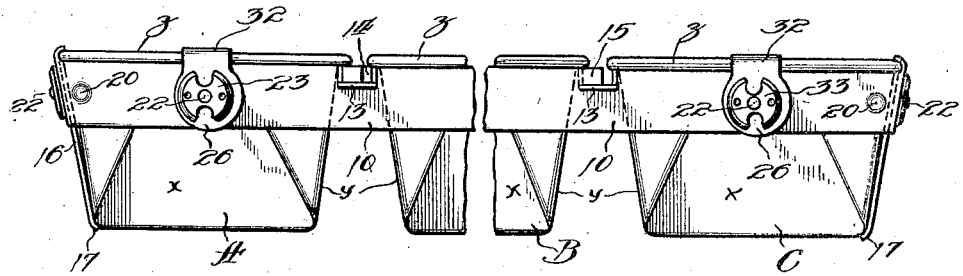
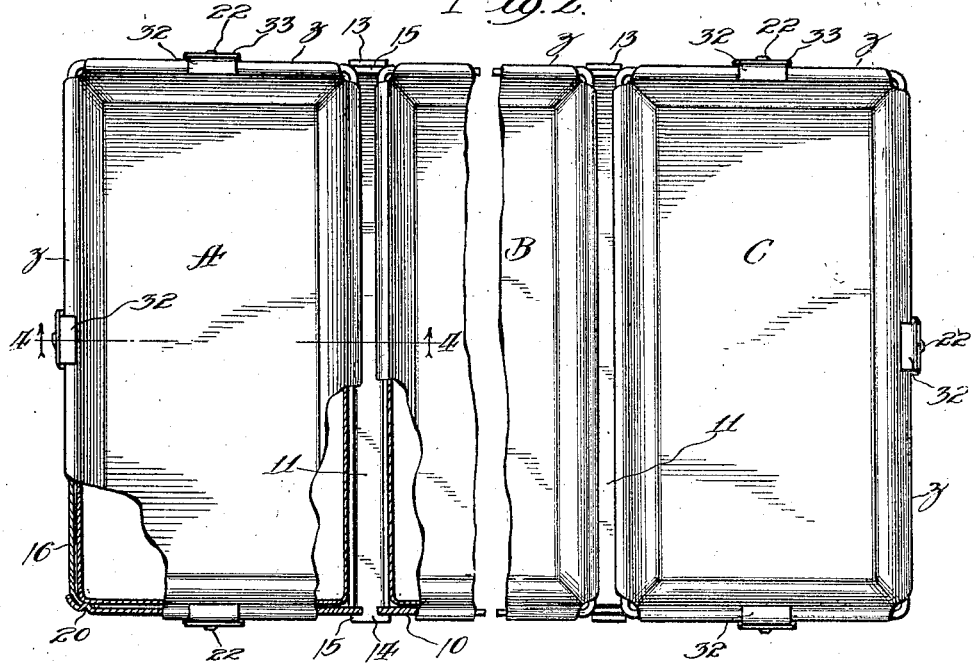
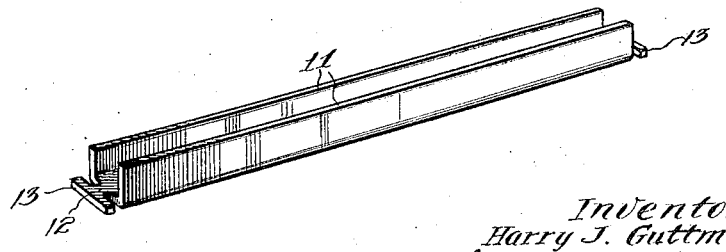
Inventor:
Harry J. Guttman, Dec. 30, 1924.
H. J. GUTTMAN
1,521,289
CLAMP FOR BAKING PANS AND THE LIKE
Filed March 4, 1922    3 Sheets-Sheet 2
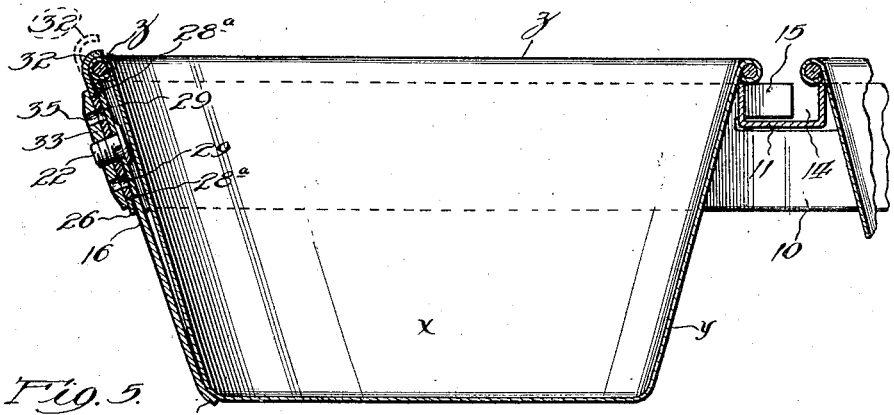
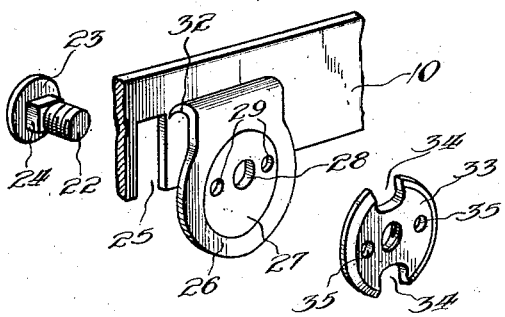
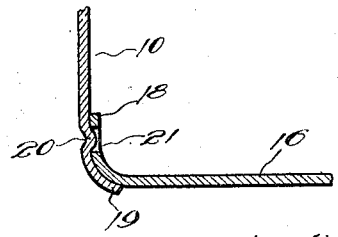
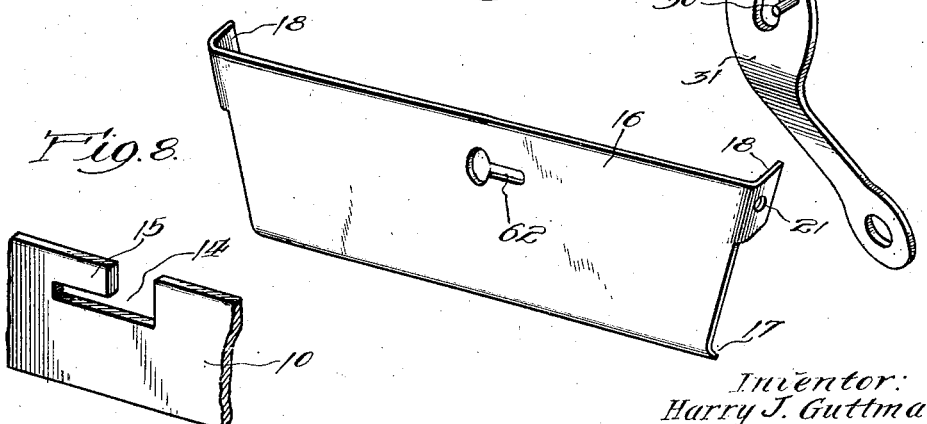
Inventor:
Harry J. Guttman, Dec. 30, 1924.
H. J. GUTTMAN
1,521,289
CLAMP FOR BAKING PANS AND THE LIKE
Filed March 4, 1922  3 Sheets-Sheet 3
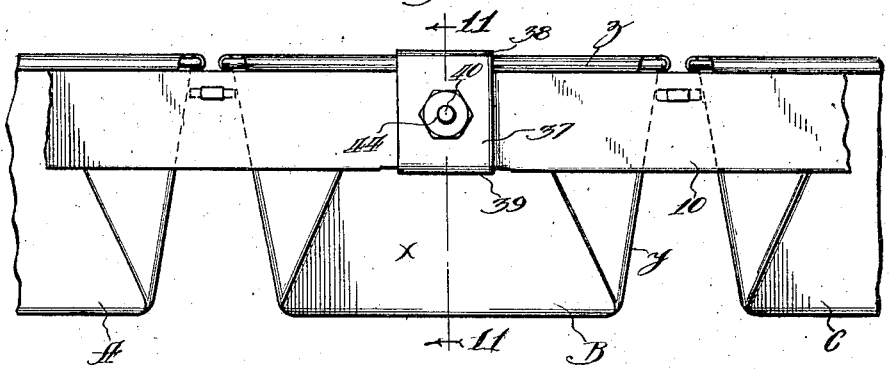
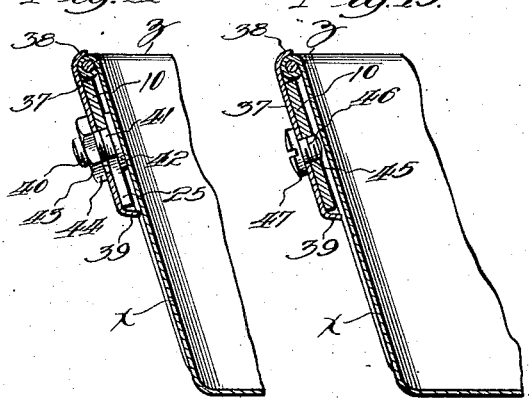
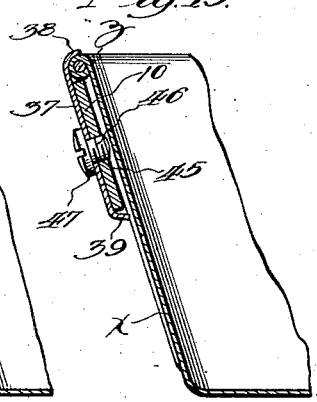
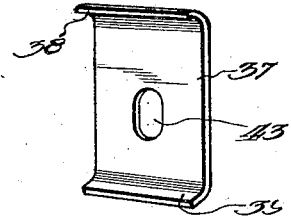
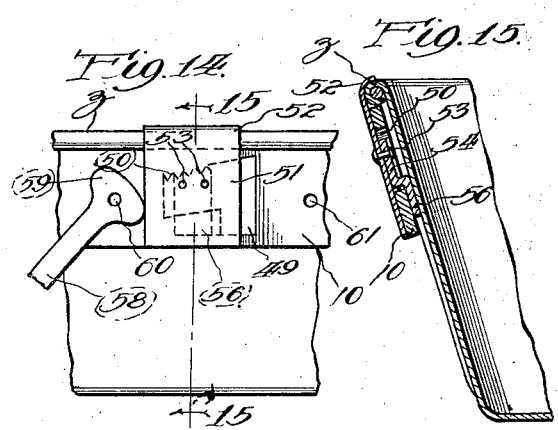
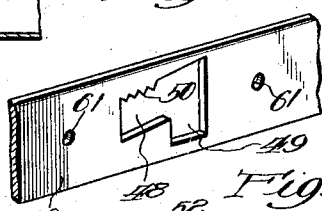
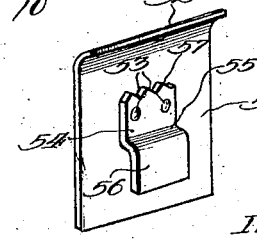
Inventor
Harry J. Guttman.

Patented Dec. 30, 1924.

1,521,289

UNITED STATES PATENT OFFICE.

HENRY J. GUTTMAN, OF CHICAGO, ILLINOIS.

CLAMP FOR BAKING PANS AND THE LIKE.

Application filed March 4, 1922. Serial No. 541,057.

*To all whom it may concern:*

Be it known that I, HENRY J. GUTTMAN, a citizen of the United States, residing at Chicago, in the county of Cook and State of Illinois, have invented certain new and useful Improvements in Clamps for Baking Pans and the like, of which the following is a specification.

This invention relates to a clamp having certain novel and improved characteristics which render it adaptable for association with other articles such as baking pans which are commonly arranged in sets of five or six for convenience in handling. The invention is concerned also with certain of the elements associated with the clamp by which its effectiveness is enhanced. Other objects and uses will hereinafter appear from the specification and claims, and from the accompanying drawings wherein a preferred embodiment of my invention is illustrated in the following manner:

Figure 1 is a side elevation of a plurality of pans united through the medium of clamps, strappings, etc.;

Fig. 2 is a plan view thereof;

Fig. 3 is a perspective of one of the channel braces connecting the strappings;

Fig. 4 is an enlarged section taken on line 4—4 of Fig. 2;

Fig. 5 is a perspective of the clamp with its several parts separated;

Fig. 6 is a detail in transverse section of the connection between one strapping and an end protection plate;

Fig. 7 is a perspective view of the end protection plate;

Fig. 8 is a fragmentary detail of the strapping at the point where connection is made with one of the channel braces;

Fig. 9 represents one form of wrench that is specially adapted for operating the clamp;

Fig. 10 which is a view somewhat similar to Fig. 1, shows a modified form of connection between a pan and its associated strapping;

Fig. 11 is a transverse section therethrough taken on line 11—11 of Fig. 10;

Fig. 12 is a view in perspective of the clamp used with the constructions of Figs. 10 and 11;

Fig. 13 which is a view similar to Fig. 11, shows a further modification of the connection between the clamp and the strapping; and Figs. 14 to 17 illustrate a still further modification thereof, Fig. 14 being a fragmentary view in side elevation, Fig. 15 an enlarged transverse section therethrough on line 15—15, Fig. 16 a fragmentary view in perspective of the strapping at the point where the clamp is connected thereto, and Fig. 17 a perspective view of the clamp per se looking toward its inner side.

In the drawings I have shown a plurality of baking pans A, B, C, etc., arranged in a row and connected together for convenience in handling. These pans are each formed in the usual manner with slightly tapering ends $x$ and sides $y$, their upper edges $z$ being outturned and reinforced with a wire in accordance with usual practice. A handling means is provided, and for this purpose two pieces of strapping 10 may be arranged against the opposite ends of the several pans and directly beneath the under side of their wire edges $z$. Between the several pans cross braces 11 may be used such as the channel member shown in Fig. 3, each end of which is formed with a neck 12 which carries a head 13. Where such a brace is used, I provide in each of the strappings 10 a bayonet slot 14 (see Fig. 8) such that the neck may enter and thereafter be shifted laterally beneath the overhanging lip 15 to lock the brace end against removal when the pans are arranged in juxtaposition, as shown in Fig. 1. By the means described, the wire edges of each pan are rested upon the several cross braces and also upon the two strappings so as to maintain the several parts firmly in position.

At the end of each pan unit is arranged a protection plate 16 best shown in Fig. 7. The upper edge of this plate is presented against the wire edge of the adjacent pan while its lower edge 17 is inturned to partly underlie the pan bottom. At each end of the protection plate is an ear 18 turned laterally to lap over or under the proximate end of the strapping 10 which, by preference, is also rounded as at 19, all as best shown in Fig. 6, and in the one part I provide a button 20 which is adapted to seat within an opening 21 formed in the other part, the protection plate and strapping being thereby connected to each other.

The strappings and end protection plates so applied to the pans in the manner described are fixedly secured thereto as by means of clamps such as are shown in Fig.

5. Each clamp may comprise a bolt 22 having a head 23 adjacent which the shank is squared as at 24, so as to lie non-rotatably within a suitable slot 25 formed in the strapping, as shown. Associated with the bolt is a plate 26 in which is rotatably mounted a disk 27 having an offcenter opening 28 through which the bolt is passed to extend to the strapping side which is opposite that on which the bolt head is rested. The disk is provided with a flange 28$^a$ which rests against the inner side of its mounting, and is also formed with spaced holes 29 in which may engage pins 30 carried by a spanner wrench 31, such, for instance, as is shown in Fig. 9. Extending laterally from the plate 26 is a lip bent over to provide a hook 32 which is adapted to overlie the wire edge of the pan. Mounted to screw upon the outer end of the bolt 22 is a locking nut 33 which bears against the hook plate and eccentric disk mounted therein. This nut is preferably notched as at 34 to permit the wrench pins 30 to engage with the disk openings 29, and in addition is provided with spaced holes 35 with which the wrench may engage for the purpose of tightening the nut against the plate and eccentric disk carried therein.

In use the clamps, such as are shown in Fig. 5, are arranged with the bolt heads on the inner side of the strappings 10, the squared shank portions lying non-rotatably within the slots 25. Each hook plate is arranged to grip the pan, and thereafter its eccentric disk is rotated to force the strapping up tightly against the under side of the wire edge, following which the nut 33 is tightened to hold the parts in this adjustment. Preferably one of these clamps is used at each end of each pan, there being suitable notches 25 in the strapping for this purpose; also a similar clamp may be used on each end protection plate, as indicated in Figs. 2 and 4.

Referring now to Figs. 10, 11 and 12 I have shown a very similar construction, the several corresponding parts of which are designated by reference numerals the same as those applied to the previous figures. The pans and strapping may be identical with those elsewhere shown and are interconnected through the medium of elements 37 each of which is in the form of a clamp having its upper edge bent laterally to provide a flange 38 adapted to overlie the outturned pan edge. Each clamp is also bent along its lower edge, as at 39, but preferably for less than 90° as appears best in Figs. 11 and 12. When the parts are operatively assembled as shown in Fig. 11, the lower flange 39 is obliquely disposed slightly relative to the proximate strapping edge, so that when the clamp is drawn tightly against the strapping the latter is wedged tightly against the under side of the pan edge. To accomplish this result, I employ a threaded bolt 40, the shank of which is squared as at 41 adjacent its head 42 which is adapted to lie on the inner side of the strapping. The squared portion of the shank fits non-rotatably in the strapping slot 25, the remaining shank portion passing through an aperture 43 that is provided in the clamp body. Preferably this aperture is slightly elongated in a direction transverse to the strapping so as to allow the bolt to move sufficiently for tight adjustments. When the bolt is related to its associated parts as shown in Fig. 11, a nut 44 is screwed onto its shank so as to bear tightly against the outer face of the clamp, thereby forcing the strapping upwardly with a variable wedge pressure against the under pan edge.

The construction just described is followed in all substantial respects in Fig. 13. In this modification, however, I provide, in lieu of the slot 25 in the strapping, an aperture 45 formed with threads with which may engage a bolt 46 whose head 47 is adapted to bear against the outer side of a clamp 37 which in all substantial respects may be similar to that shown in Fig. 12. This construction is to be distinguished from the one last described mainly in that a nut is dispensed with, the position of the bolt relative to the clamp and strapping being reversed, its connection with the latter depending upon the presence of threads in a suitably formed aperture therein.

In Figs. 14 to 17 inclusive I have set forth a construction which dispenses with such parts as nuts, bolts, etc. The strapping in this instance is provided with an inclined slot 48 enlarged at one end 49 for a purpose to be presently explained, one of the slot edges as at 50 being preferably toothed or serrated. Associated with such a strapping is a plate 51 having its upper edge 52 bent over to provide a flange which is adapted to overlie the outturned edge of a pan. Connected as by rivets 53 to the inner side of the plate 52 is a member 54 offset as at 55 to provide an outstanding tongue 56. Along its upper edge 57 the member 54 is preferably serrated or toothed in a manner complementary to the teeth 50.

This member 54 provides a medium for connecting the clamp to the strapping in the manner shown in Figs. 14 and 15. Initially the offset tongue 56 is passed through the enlarged end 49 of the slot 48, following which the flange 52 is arranged in overlying relation to the pan edge with the upper strapping edge in underlying relation thereto. Thereafter the plate is shifted longitudinally of the strapping within the slot 48 whose upper and lower edges, as already stated, are inclined, this inclination being downward in the direction of the wedging movement of the plate. During this shift of positions the plate not only draws the strapping upwardly with increasing pressure against the under side of the pan edge, but the teeth 50 and 57 are interengaged to prevent return movement of the plate except with the application of a very considerable force. To facilitate adjustments of the plate to final locking position resort may be had to a cam tool (see Fig. 14) comprising a handle 58 connected with a head 59 from which projects laterally an eccentric pin 60 which is adapted to pivot in a hole 61 formed in the strapping. Preferably two such holes are provided, one to either side of the slot 48, so that the cam tool may be applied operatively to either force the plate to locking position, or, if necessary, to retract the plate to unlocking position for the purpose of disconnecting a pan from its associated strappings.

The arrangements herein described and shown are such that pans of ordinary form and construction may be brought together and maintained in unitary relation without altering, modifying or mutilating their construction in the least. If any one pan should become unfit for use, it may be withdrawn from the unit assembly, and a new one substituted, thereby saving the unit for further use. In addition the strappings and end protection plates are so related to each other as to form a rigid mounting for the several pans comprising the unit, the lower edges of the protection plates, which underlie the bottom edges of the end pans, protecting the unit when placed or moved upon the oven floor.

It will be observed that each of the slots 14 extends lengthwise of the strapping for a distance sufficient to permit the cross braces to take up different positions longitudinally of the unit, and this is desirable so that the several pans may be shifted lengthwise thereof to each occupy an abutting relation to the cross brace so as to derive reinforcement therefrom. In Fig. 7 the end protection plate is shown with a slot 62 in the general form of a key hole for the reception of the bolt 22. In Figs. 4 and 7, this is suggestive of one construction that may be employed in lieu of the square slot shown in Fig. 5. There is an advantage, however, in providing the strappings with square slots which open on one edge thereof as the clamp may be completely disengaged from the pan whenever the tightening nut is sufficiently unscrewed for this purpose. When the clamps at each end of a single pan have been so adjusted, the pan may be removed without disturbing the remainder in the unit. In the case of an end protection plate, however, no such conditions exist, and for this reason the slot formed therein for the reception of the bolt may take the form of a key hole or any other desired opening.

It is to be observed that my invention is concerned not merely with certain means for uniting several pans or other articles in unitary relation, but also discloses a clamping hook which assists in this purpose. Accordingly it is to be understood that, as defined by the claims below, this invention may be adapted to different uses or be variously modified without departing from the principles which impart novelty and utility thereto.

I claim:

1. In combination with a plurality of pans having outturned upper edges and arranged side by side, a strapping positioned upon each of the opposite ends thereof and adapted to underlie an outturned edge of each pan, there being a slot in the strapping adjacent each pan, a bolt entered through each slot having its head rested against the inner side of the strapping, a hook plate and an eccentric disk mounted therein, the hook portion of the plate being engaged with the wire edge of the pan and the bolt passing through the disk at an offcenter point, and means threaded to the bolt for clamping the plate and disk, and adapted when tightened thereagainst to maintain the same against rotation, substantially as described.

2. In combination with a pan having a tapering wall and an outturned upper edge, supporting means therefor arranged adjacent the wall beneath its edges, and means for clamping the supporting means to the pan comprising a hook overlying the pan edge, and in the hook body a rotatable disk having an offcenter aperture therethrough, a bolt removably entered through the supporting means and through the offcenter aperture in the disk, with its head against the inner side of the support, and clamping means threaded onto the bolt and adapted to bear against the disk and hook body to maintain these parts in a fixed position of adjustment, substantially as described.

3. In combination with a plurality of pans each having tapering walls and an outturned upper edge, the pans being arranged side to side in a row, strappings overlying each of the opposite ends of the several pans, protection plates arranged between the strappings at their ends and lying adjacent the sides of the proximate pans, each protection plate being extended downwardly to present a portion of itself beneath the proximate edge of the pan, and means removably connected to both the strappings and plates and the pan adapted to clamp each to the other, similar means also clamping each protection plate to its pan, substantially as described.

4. In combination with a plurality of pans having outturned upper edges and arranged side by side, means for securing the pans in unitary relation comprising strappings engaged with the ends of each pan, cross braces connecting the strappings, resting against the pan edges, and clamping devices removably connected both to the pans and to the strappings and adapted to draw the latter tightly against the pan edges.

5. In combination with a plurality of pans having outturned upper edges and arranged side by side, means for securing the pans together in unitary relation comprising strappings engaged with the pan ends, protection plates arranged adjacent the outer sides of the end pans, means removably connecting the plates and strappings, cross braces extending between the strappings intermediately of their ends and removably secured thereto, and clamping devices connecting each strap and protection plate to the pans, substantially as described.

6. In combination with a plurality of pans having outturned upper edges, the pans being arranged side by side in a row, strappings arranged along each side of the row, cross braces extending between the strappings and lying between the pans, a slip connection between each cross brace and the strappings such that the brace is shiftable longitudinally thereof, and removable clamping means adapted to connect each strapping to the pans adjacent the outturned edges thereof, substantially as described.

7. In combination with a plurality of pans having outturned upper edges, the pans being arranged side by side in a row, strappings arranged upon each side of the row adjacent the pans, there being slots opening onto one edge of each strapping, and clamping devices arranged to overlie the pan edges and to engage with the strapping slots, said devices being adapted to draw the strappings tightly against the lower sides of the outturned edges of the pans, substantially as described.

8. In combination with a plurality of pans having outturned edges, the pans being arranged side by side in row, means adjacent each side of the row for binding the several pans in unitary relation, and clamping devices connecting said binding means with each pan comprising a hook adapted to overlie the upper edges thereof, an element connected with the hook engaged removably with the binding means, and an eccentric for drawing the binding means toward the hook whereby said means is forced tightly against the lower side of the outturned edges of the pan, substantially as described.

9. A clamping device of the kind described comprising a hooked plate, an eccentric disk rotatably mounted therein, means about which the disk revolves adapted to engage a member, and other means for clamping the eccentric disk in a desired rotative position of adjustment relative to the hooked plate, substantially as described.

10. A clamping device of the kind described comprising a bolt adapted to be non-rotatably connected with a member, a circular disk having an eccentric opening through which the bolt extends to provide an axis of rotation therefor, a hooked plate formed to provide a mounting in which the disk may rotate, and a nut threaded to screw onto the bolt and clamp against both the disk and plate to maintain these parts in a selected position of rotative adjustment, substantially as described.

11. A clamping device of the kind described comprising a bolt having a non-rotative mounting in a member, a circular disk having an eccentric opening through which the bolt extends to provide an axis of rotation therefor, a hooked plate in which is a mounting for the disk to rotate therein, there being diametrically opposite openings in the disk with which the pins of a spanner wrench may engage, and a nut threaded to screw onto the bolt to clamp the disk in a definite position of rotative adjustment relative to the plate, the nut being formed with diametrically opposite notches providing a clearance through to the spaced openings in the disk therebehind, and being formed also with other diametrically opposite openings spaced apart the same distance as are the disk openings whereby the pins of the same spanner wrench may be used for rotating the nut, substantially as described.

12. In combination with a pan having an outturned upper edge, handling means therefor adapted to underlie the pan edge, and a device arranged to overlie the pan edge and also clamp the said handling means thereunder with a variable pressure, substantially as described.

13. In combination with a pan having an outturned upper edge, handling means therefor in the form of strapping arranged adjacent the pan side with its upper edge against the under side of the pan edge, and a device connected with the strapping adapted to engage the upper side of the pan edge, said device being adjustable to force the strapping against the under side of the pan edge with a variable pressure, substantially as described.

14. In combination with a plurality of pans each having an outturned upper edge, means for removably connecting said pans in unitary relation comprising, in each instance, a clamp adapted to hook over an upper edge of a pan, and an element engaged by the clamp extending from one pan to another beneath an upper edge of each, the clamp being adjustable relative to its associated parts to wedge the element with a variable pressure against the under side of a pan edge, substantially as described.

15. In combination with a pan having an outturned upper edge, handling means therefor in the form of a strapping adapted to rest its upper edge beneath the pan edge, means connecting the strapping to the pan comprising a plate having its upper edge bent to overlie the pan edge and its lower edge bent to wedgingly engage the lower strapping edge, and means for drawing the plate tightly against the strapping whereby a variable wedge pressure is exerted thereupon tending to force the strapping upwardly against the pan edge, substantially as described.

16. In combination with a pan having an outturned upper edge, handling means therefor in the form of a strapping adapted to rest its upper edge against the under side of the pan edge, and means connecting the strapping to the pan comprising a plate having its upper edge bent to overlie the pan edge and a member secured to the plate formed to provide an offset tongue, the strapping having an inclined slot through which the tongue is extended to lie upon the rearward side thereof, whereby the strapping is pressed upwardly against the pan edge with a variable pressure as the plate is shifted lengthwise of the slot, substantially as described.

HENRY J. GUTTMAN.

Witness:
   EPHRAIM BANNING.